Bulkley & Inman.
Shearing Metal.

N° 2,325.   Patented Nov. 3, 1841.

UNITED STATES PATENT OFFICE.

WILLIAM BULKLEY AND OTIS M. INMAN, OF BERLIN, CONNECTICUT.

MACHINE FOR CUTTING TIN AND OTHER METAL.

Specification of Letters Patent No. 2,325, dated November 3, 1841.

*To all whom it may concern:*

Be it known that we, WM. BULKLEY and OTIS M. INMAN, of Berlin, in the county of Hartford and State of Connecticut, have invented a new and useful Improvement in Shears; and we declare that the following is a full, clear, and exact description of the same, reference being had to the annexed drawings, making a part of the following specification.

Figure 1:
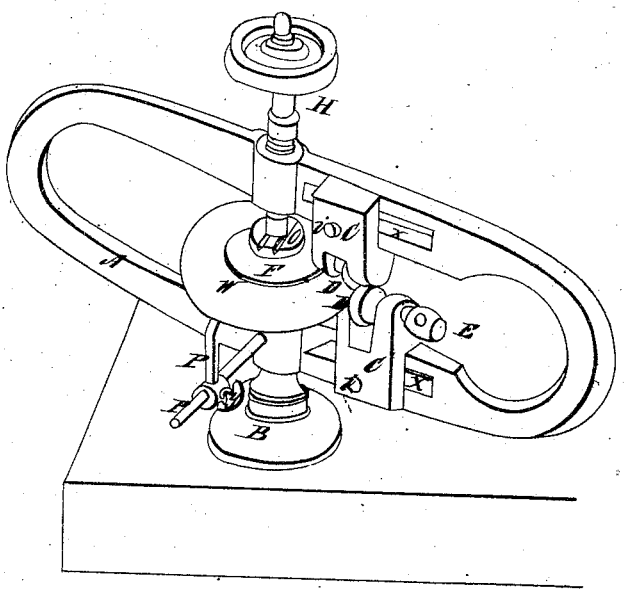
Figure 2:
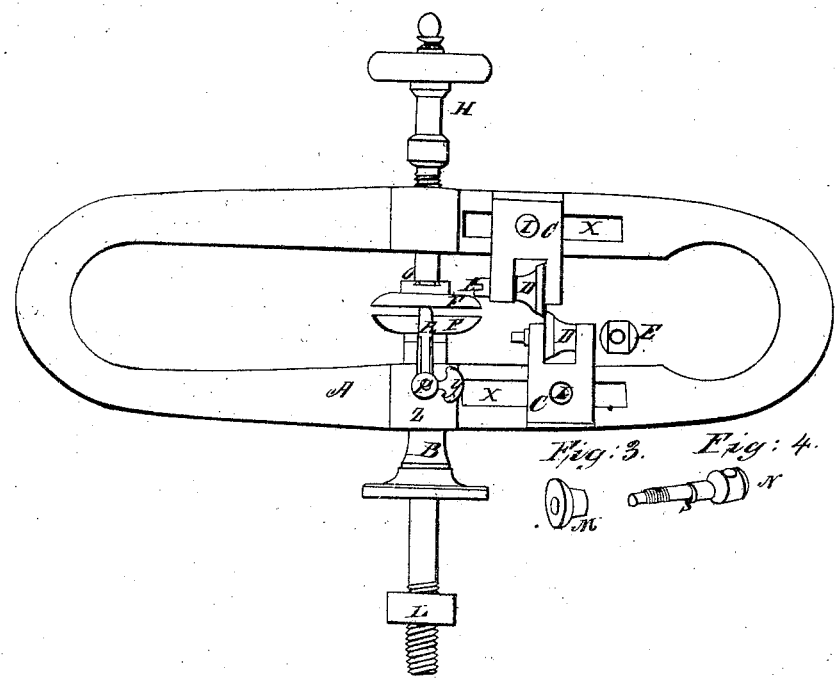

Figure 1, is a perspective. Fig. 2, a longitudinal elevation.

A A Figs. 1 and 2 is a frame made of cast iron of an elliptical form 2 feet and 8 inches in length and about 2 inches thick.

B B, are arbors (or axes) which the frame revolves on and $1\frac{1}{4}$ inches in diameter made of cast steel, having a shoulder turned on it and passing through the frame at Z the arbor B, being made fast (or stationary) it must work in the frame free.

H, H, is a screw which is turned down so as to press the clamps F F together and made of cast steel $1\frac{1}{8}$ of an inch in diameter, the lower part turning on a swivel at O, O, and revolving with the frame.

R, R, is a gage to govern the size of the circle to be cut, movable on the arbor P, P. The arbor is made of a small rod of iron $\frac{1}{2}$ inch in diameter and screwed into the frame at right angles. The gage R is made to slide free in the arbor and held by a thumb screw $y$, $y$.

C, C, C, C, are studs movable in the slits X, X, X, X, in the frame A made of iron, being 2 inches broad and $\frac{3}{8}$ of an inch thick, with a shoulder resting on the frame as seen at Fig. 1, in perspective, and made fast in their respective places in the frame by means of the screws I, I.

Figures 3, 4:

D, D, D, D, are cutters made of cast steel of a conical form and about 1 inch across the base that being used as the edge of the cutters, and they revolving on their axis E, E, E, the edges coming in contact and held in their position by means of shoulders on the arbors E, E, as seen at S, Fig. 4. N being the arbor. M Fig. 3, being the cutter.

The metal to be cut being put between the clamps F, F, Figs. 1 and 2 the screw H, is run down upon it holding it fast to its place as seen at W, Fig. 1, the size of the circle to be cut is first ascertained, and the gage R, and cutters D, D, moved to correspond, the arbor B, being made fast in a vise or by other means, motion being given to the frame A, the metal passes into the cutters D, D, and with one revolution of the frame cuts an entire circle, the metal remaining at rest, as also the arbor B, the screw H turning upon the clamp F, at the point O.

We do not claim as our invention the bow or frame, or its application to the arbor, nor do we claim the attachment of the shears so as to carry them around the arbor, as these have all been known before, but what we do claim as our invention and desire to secure by Letters Patent is—

Attaching the studs in which the shears work to the bow or frame which receives the gudgeons or bearings of the arbor and which travels around on it, substantially in the manner described.

WILLIAM BULKLEY.
OTIS M. INMAN.

Witnesses:
SHERMAN WILCOX,
MERICK ROBERTS.